(12) United States Patent
Gurin

(10) Patent No.: US 12,405,404 B2
(45) Date of Patent: Sep. 2, 2025

(54) MOBILE OPTIMIZED VISION SYSTEM

(71) Applicant: Michael Gurin, Glenview, IL (US)

(72) Inventor: Michael Gurin, Glenview, IL (US)

(73) Assignee: Michael Gurin, Glenview, IL (US)

( * ) Notice: Subject to any disclaimer, the term of this patent is extended or adjusted under 35 U.S.C. 154(b) by 481 days.

(21) Appl. No.: 17/985,904

(22) Filed: Nov. 14, 2022

(65) Prior Publication Data

US 2023/0080390 A1 Mar. 16, 2023

Related U.S. Application Data

(63) Continuation-in-part of application No. 16/535,955, filed on Aug. 8, 2019, now abandoned, and a continuation-in-part of application No. 15/584,003, filed on May 1, 2017, now Pat. No. 10,437,012.

(51) Int. Cl.
*G02B 3/00* (2006.01)
*H04N 23/54* (2023.01)
*H04N 23/55* (2023.01)
*G02F 1/163* (2006.01)

(52) U.S. Cl.
CPC .............. *G02B 3/00* (2013.01); *H04N 23/54* (2023.01); *H04N 23/55* (2023.01); *G02B 2003/0093* (2013.01); *G02F 1/163* (2013.01)

(58) Field of Classification Search
None
See application file for complete search history.

(56) References Cited

U.S. PATENT DOCUMENTS

| | | | | |
|---|---|---|---|---|
| 6,031,946 | A * | 2/2000 | Bergmann | G02B 6/3512 385/18 |
| 2012/0013786 | A1* | 1/2012 | Yasuda | H04N 23/635 348/349 |
| 2015/0323760 | A1* | 11/2015 | Tomosada | G02B 7/28 250/201.2 |
| 2017/0227770 | A1* | 8/2017 | Carollo | G02B 27/0172 |
| 2017/0343768 | A1* | 11/2017 | Shirai | G03B 13/36 |

* cited by examiner

*Primary Examiner* — Sharrief I Broome
*Assistant Examiner* — Journey F Sumlar

(57) ABSTRACT

An optical imaging system leveraging an ultra-thin flat metalens to increase system functionality with a reduced set of imaging sensors. The optical imaging system is particularly adept at reconfiguring to and camouflaging within its external environmental.

20 Claims, 13 Drawing Sheets

Example A

Example B

Example C

Non-Imaging Optics on Camera Sensor

Room Layout

Meta-lens Full Area

Meta-Lens Concentrated Area

Side View 1

Side View 2

Top View

Side View

Actual Image - 10

Image on Camera as Imaging Optic - 10.1

Actual Image - 10

Image on Cameria Sensor as Non-maging Optic 10.2

MOBILE OPTIMIZED VISION SYSTEM

CROSS-REFERENCE TO RELATED APPLICATIONS

This application claims the benefit of patent application U.S. Ser. No. 15/584,003 titled "Mobile Optimized Vision System" filed on May 1, 2017, and this application claims the benefit of patent application U.S. Ser. No. 16/535,955 titled "Mobile Optimized Vision System" filed on Aug. 8, 2019, both hereby incorporated by reference in its entirety.

FIELD OF INVENTION

The present invention relates to the strategic use of environmental-facing surface conforming integration of ultra-thin optical lens elements to enable new applications including advance coatings to increase the image clarity even in adverse weather conditions.

BACKGROUND OF INVENTION

Prior art focuses on a wide range of surface coatings to repel ice, dirt/dust, and fluid droplets from forming and/or staying on a window (i.e., a transparent, at least to the light spectrum window of the imaging sensor). In numerous instances the surface coatings are insufficient to provide visual clarity, especially when the imaging element is ever decreasing in size (as the substance remaining on the window is of relatively significant size to the imaging element creating image blurriness).

Another embodiment of the prior art focuses on a wide range of active cleaning measures including wiper blades, resistive heating elements, surface acoustic waves, etc. In numerous instances the physical size of the window of the imaging sensor is too large to practically, cost-effectively and energy consumption to thoroughly and actively clean the window area over the imaging sensor.

Yet another prior art is ever diminishing camera sizes (both in terms of radius of optical elements in addition to depth of system) though fixed imaging angles between the camera and the host system (inclusive of display a.k.a. graphical display unit) limiting the functionality and features within the host system.

SUMMARY OF INVENTION

The present invention is an imaging system having dynamically reconfigurable ultra-thin optical elements that yields features well beyond the simple size reduction of the imaging system (a.k.a. camera).

A further object of the invention is to leverage the ultra-thin optical element, particularly a metalens, to dynamically decouple an imaging angle from a host electronic device user interface (i.e., display) angle.

A yet further object of the invention is to leverage the metalens size to directly integrate multiple lenses that are interchangeable with a single imaging sensor (i.e., camera) such that the relative position of the imaging sensor and "correct" metalens can be altered using a microactuator (or even a MEMS device) via rotating or sliding motion without removal of either of the metalens portions.

Another further object of the invention is to leverage the metalens with an electronically controlled shading mechanism (e.g., electrochromic) filter to rapidly and interchangeably alter the active metalens portion.

Yet another object of the invention is to reduce the relative position between the at least two different metalens "zones" to the imaging sensor, such that the relative motion required is at least 20% lower than without the use of a metalens.

Another object of the invention is to leverage the metalens optical design in a conformal shape precisely matching the exterior shape of the host device (e.g., automobile, airplane, smartphone, etc.).

Yet another object of the invention is to leverage the size and switching ability between a portion of the metalens and another portion such that the host device utilizes a primary position for imaging optics and a secondary position for non-imaging optics, such that the host device utilizes the non-imaging optics for sensing calculations rather than visual imaging.

Another object of the invention is to utilize the non-imaging optics for additional functionality within the electronic host device such as host user safety by avoiding objects that are within the projected pathway (e.g., walking onto a street).

Yet another object of the invention is to utilize a rapidly switchable metalens (portion) to leverage a singular imaging sensor (camera) for multiple directions without any movement realized from external of the host device.

Another object of the invention is to integrate and embed the metalens and imaging sensor within an automotive indicia (i.e., logo) such that the camera doesn't create any additional surface area as compared to an indicia without a camera.

A further object of the invention is to utilize the metalens, and its fundamental conformity to the external surface of the host device (vehicle) and its significant size reduction to enable both active and passive measures to prevent ice adhesion. The best implementation of the invention eliminates any physical movement of the camera for deployment.

Yet another object of the invention is to utilize horizontal surfaces within a host device component (e.g., automotive indicia) to reduce dirt, dust, and/or ice adhesion while concurrently leveraging reduced lens size and optical design flexibility to camouflage the metalens into the host device component.

Another object of the invention is to utilize dynamic positioning of the imaging sensor relative to the lens (metalens) to vary imaging source in accordance to operating mode of the host device (e.g., room, car interior, car exterior) in which the imaging sensor leverages both imaging and non-imaging optics to achieve high-precision (less than 5% distance error) location determination.

Yet another object to the invention is to leverage the size of the metalens in combination with conformity to the host device external surface to camouflage the metalens, particularly when not being actively used by active electronic color matching mechanism to the host device external surface color.

Another object to the invention is to economically incorporate active measures to clean the metalens uniquely enabled by the flat profile of the metalens, the small size reducing the size (therefore the cost) of active measures, the small size in combination with the multiple active metalens portions such that the active cleaning measures are performed over a portion of the metalens not currently being used.

DEFINITIONS

Figure 1:
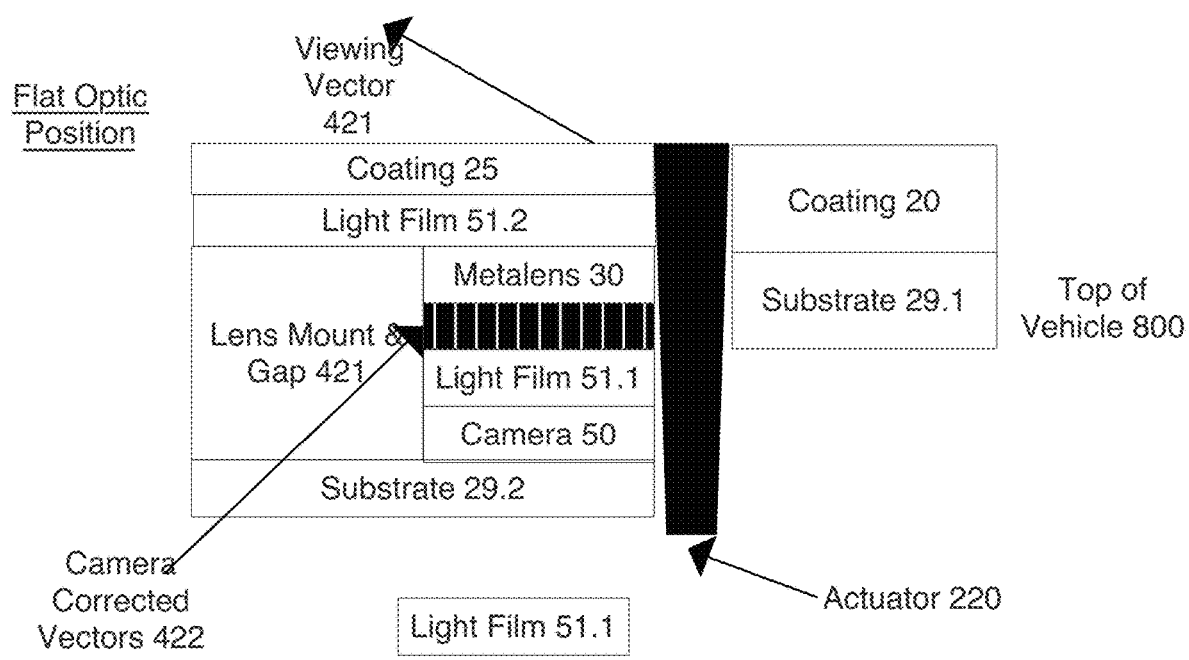
FIG. 1 is a top view of the internal components in a camera adjoining to a host device housing.

The term "flat lens" refers to a category of lens that virtually eliminate optical aberrations such as the "fish-eye" effect that results from conventional wide-angle lenses. Astigmatism and coma aberrations also are minimized with a flat lens, so the resulting image or signal is completely accurate and does not require significant complex corrective techniques. A flat lens can be an array of nanoantennas, also referred to as a "metasurface" or "metalens", that can be fine-tuned for specific wavelengths of light by simply changing the size, angle, and spacing of the antennas. A flat lens (a.k.a. optically thin lens) is typically less than 100 microns in depth, preferably less than 5 microns in depth, and particularly preferred less than 200 nanometers in depth. It is understood that the metalens (this term is used throughout this invention) can be designed to achieve either imaging or non-imaging optics.

The term "metamaterial" refers to a category of nanostructures that act as "atoms," arranged on a substrate to alter light's path in ways no ordinary material can achieve, these surrogate substances can manipulate an incoming light beam to enable the creation of devices inclusive of optical filters or within the context of this invention devices that steer light beams.

The term "autonomous" or "semi-autonomous" vehicle is a vehicle that drives at least a reduced set of input instructions from a driver, i.e., is driven by any embodiment of a computer (i.e., artificial intelligence, used interchangeably with "A.I.") as known in the art. In the present invention, autonomous mode may not require human presence within the vehicle for driving or may use remote control/access. In such an embodiment, the requirement for imaging systems (i.e., camera) to achieve traditional imaging optics is substantially if not entirely relaxed, such that a metalens having known non-imaging optics retains virtually all the functionality of imaging optics to determine object motion, presence, direction, etc.

The term "non-autonomous" refers to a vehicle which primarily requires a human driver control, with or without computer/A.I. assistance (such as blind spot (also shown as blind-spot indicating similarity to a classically defined "blind spot" but also inclusive of where the wireless device has a wireless signal strength change dS as a function of time dt above a dS/dt threshold) alerts or parking assist as known in the art). These modes are mutually exclusive with each other.

The term "non-imaging optics" refers to an optical element in which the transfer of light radiation between a source and a target does not attempt to form an image of the source onto the target, as distinguished from "imaging optics" refers to an optical element in which the transfer of light radiation between a source and a target does attempt to form an image of the source onto the target. In other words the imaging optic attempts to maintain a non-distorted image of the source onto the target. While a non-imaging optic does not maintain a representative image of the source onto the target, such representation of the source can be distorted, segmented in a non-continuous manner, or even have portions of the source not be radiated onto the target. This definition is consistent with Wikipedia's definition for non-imaging optics.

DETAILED DESCRIPTION OF INVENTION

Here, as well as elsewhere in the specification and claims, individual numerical values and/or individual range limits can be combined to form non-disclosed ranges.

Exemplary embodiments of the present invention are provided, which reference the contained figures. Such embodiments are merely exemplary in nature. Regarding the figures, like reference numerals refer to like parts.

Turning to FIG. 1, FIG. 1 is a configuration of the imaging system, collectively comprising the metalens (which is interchangeably referred to as "flat lens", "flat optics", "ultra-thin optics/lens") 30, imaging sensor (50, a.k.a. active component of camera), lens mount with integral gap 421 such that the optical vector/pathway from external of the metalens (with or without the optionally shown coating 25) is precisely directed to the imaging sensor 50 all further mounted on a substrate (a.k.a. circuit board) 29.2 that can also double as the exterior case for the entire imaging system. The non-corrected optical light pathway starts from a viewing vector 421 that passes through the metalens 30 into a camera corrected vector 422. The optimal embodiment of the invention has the imaging system with coating 25 that has is conformal/flush with the coating 20 on the non-flat exterior surface with coated substrate 29.2 (i.e., vehicle body). An optional actuator 220 as depicted can be a mechanism to displace any ice that could adhere to the coating 25, or alternatively an actuator to eject out a washing fluid. The preferred configuration is such that top of the vehicle 800 is closest to the actuator 220. A primary feature of the flat optics (metasurface lens, metalens) is a greatly reduced coated 25 surface area, which is fundamental in reducing any actuator 220 force required for ice removal (along with also reducing any optional active cleaning or mechanical activated cleaning devices as compared to a traditional non-flat optics lens. It is a further embodiment of the invention that the coating is a composite laminate comprised of an optional organic film 51.2 (including films as developed by Technische Universitat Munchen (TUM)) directly onto the metalens to increase the light sensitivity by at least 5% (preferably greater than 20%, and specifically preferred greater than 50%), thus further enabling the metalens to perform better even though the effective camera visibility surface area is greatly reduced. The less than optimal vector (viewing vector, 421) as the metalens is required to "standardize" a camera to a flush position with the exterior surface that enables much easier cleaning of the lens, in a non-standard mounting orientation (i.e., virtually every different mounting spot will have a different inherent optical vector). Therefore, the superior embodiment of the imaging system has a standardized imaging sensor with a standardized mounting system, plus a customized non-standard metalens (with optional image-correction measures), plus a light sensitivity enhancement coating (e.g., organic coating). The resulting imaging system is further comprised of a cleaning (active and passive) system (not shown in this figure) to clean the metalens with or without coating 25 as the optical surface area (that area in which light or imaging is captured onto the imaging sensor) is now more viable due to the greater than 50% (preferably greater than 80%, specifically preferred greater than 90%) reduction of exposed surface area as compared to a traditional non-metalens. This is critically important by enabling active cleaning to be more economical as dust particles are more harmful to image quality as the imaging area is reduced (i.e., dust particle size to image metalens size ratio is higher, as the metalens size diminishes). A preferred imaging sensor 50 is an organic sensor having light sensitivity gains at least 50% more sensitive to light than conventional CMOS sensors (and preferably gains at least 150%, and specifically preferred gains of at least 300%). Another embodiment is the use of a CMOS (as imaging sensor 50) with an ultra-thin (less than 10 microns, preferably less than 2 microns, and particularly preferred less than 1 micron) film 51.1 made of organic compounds (i.e., polymer, preferably a conductive polymer) applied onto the top surface of the imaging sensor 50.

Figure 2:
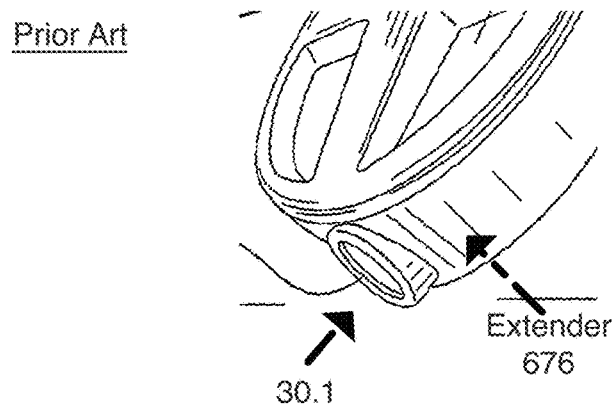
FIG. 2 is prior art depicting a camera with an extender beyond the exterior surface.

Turning to FIG. 2, FIG. 2 depicts the prior art of an imaging system in a vehicle. In this embodiment, the imaging system is embedded into an automotive indicia where clearly the lens is not flush with the external surface. The lens 30.1 (which is indicative of the entire imaging system, though not shown) also has an extender 676 to compensate for a non-optimal angle relative to the imaging target (not shown).

Figure 3:
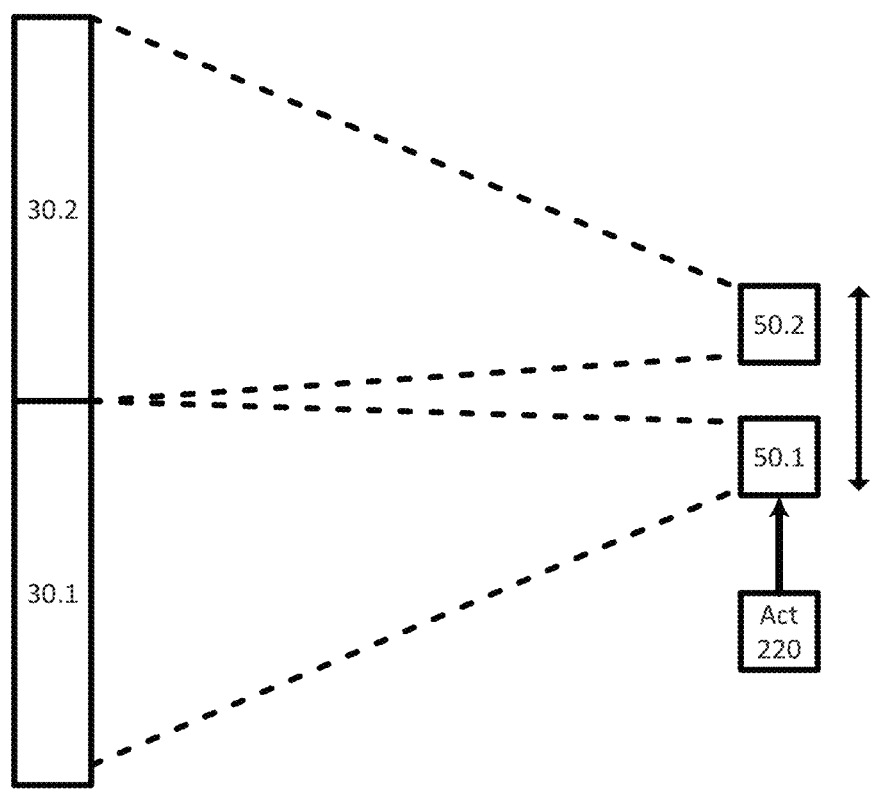
FIG. 3 is another top view of the internal components in a camera.
Figure 9:
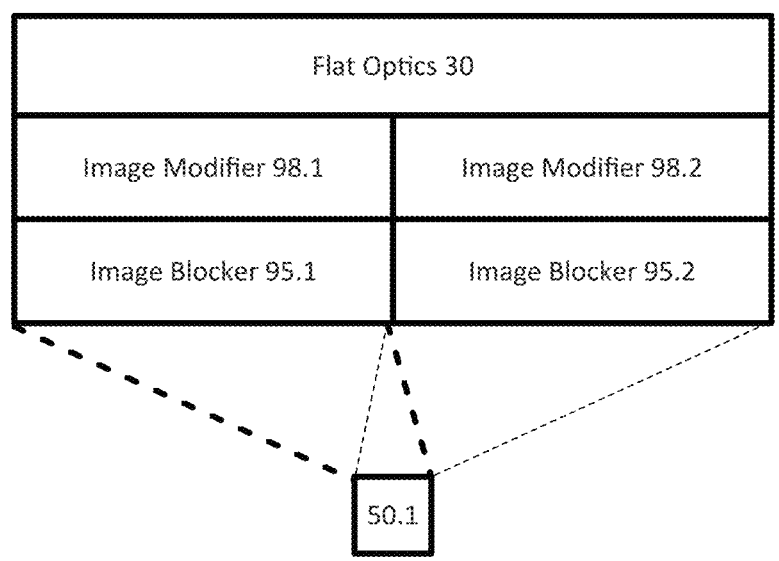
FIG. 9 is a top view of internal components of imaging sensor (camera).

Turning to FIG. 3, FIG. 3 depicts two distinct metalens portions (respectively 30.1 and 30.2) that support a singular imaging sensor (shown in two distinct positions, 50.1 and 50.2) which moves between positions via an actuator 220. A distinct feature of the invention is the metalens "focuses" the image towards the convergence point between the two distinct positions 50.1 and 50.2 to minimize the distance in which the imaging sensor needs to move in order to support both metalens portions. Though not shown in this figure, it is a feature of the invention such that (the addition of an image blocker) enables both metalens portions (30.1 and 30.2) to "focus" onto a singular position of the imaging sensor 50.1, such that the image blocker enables the singular imaging sensor to support multiple viewing modes (by blocking all overlaid images from the other metalens portion (i.e., zone) without requiring any mechanical movement. It is understood that the use of a micromirror, as known in the art, can be included to redirect light in between the metalens and the image sensor such that the preferred embodiment changes the direction of the image sensor and places the micromirror behind (relative to the metalens) the image sensor. The flat optics 30 as depicted in FIG. 9 is represented in more detail in this FIG. 3 as a lens system comprised of two distinct adjoining lens segments and fixed in position relative to each lens segment to the other lens segment. As noted in the definition of flat optics one segment can be a non-imaging optic lens and the other segment can be an imaging optic lens. In this FIG. 3 embodiment the source image of the first lens segment 30.1 has its light radiation focused onto the target as depicted by imaging sensor (a.k.a. target) 50.1 at the first position relative to the actuator 220 and the source image of the second lens segment 30.2 has its light radiation focused onto the target as depicted by imaging sensor 50.2 at the second position relative to the actuator 220. FIG. 9 is another embodiment for switching source image onto the target but using an image blocker instead of an actuator.

Figure 4:
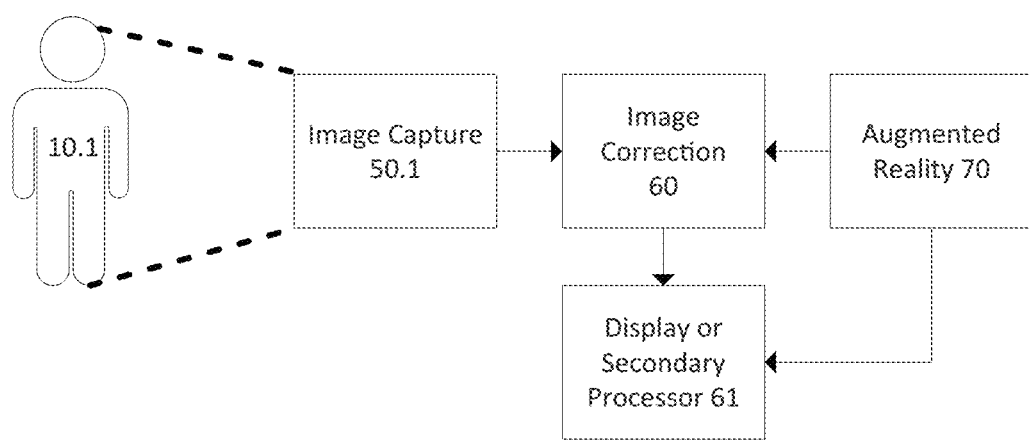
FIG. 4 is a process flow for image processing in augmented reality.

Turning to FIG. 4, FIG. 4 leverages a fundamental feature of a metalens (not shown, but understood to be in the same configuration as FIG. 3) in advance imaging systems with comprehensive image manipulation for purposes other than person "video" display. The image capture as done by an image sensor 50.1 (is understood to enable either imaging or non-imaging optics with the latter having known alterations to the image as compared to the resulting non-imaging optics). The image on the image sensor 50.1 is modified by an image correction 60 measure (which can be a further metalens, or electronic processor for pixel to pixel modification) where the then resulting corrected image is shown to a user of a host imaging system device as shown within a display or subsequently computed by secondary processor 61 for a wide range of anticipated actions as known in the art including collision avoidance, autonomous driving, safety alerts etc. when such host device is a vehicle. An augmented reality 70 image processor enables the display 61 to have the overlaid image for user interaction.

Figure 5:
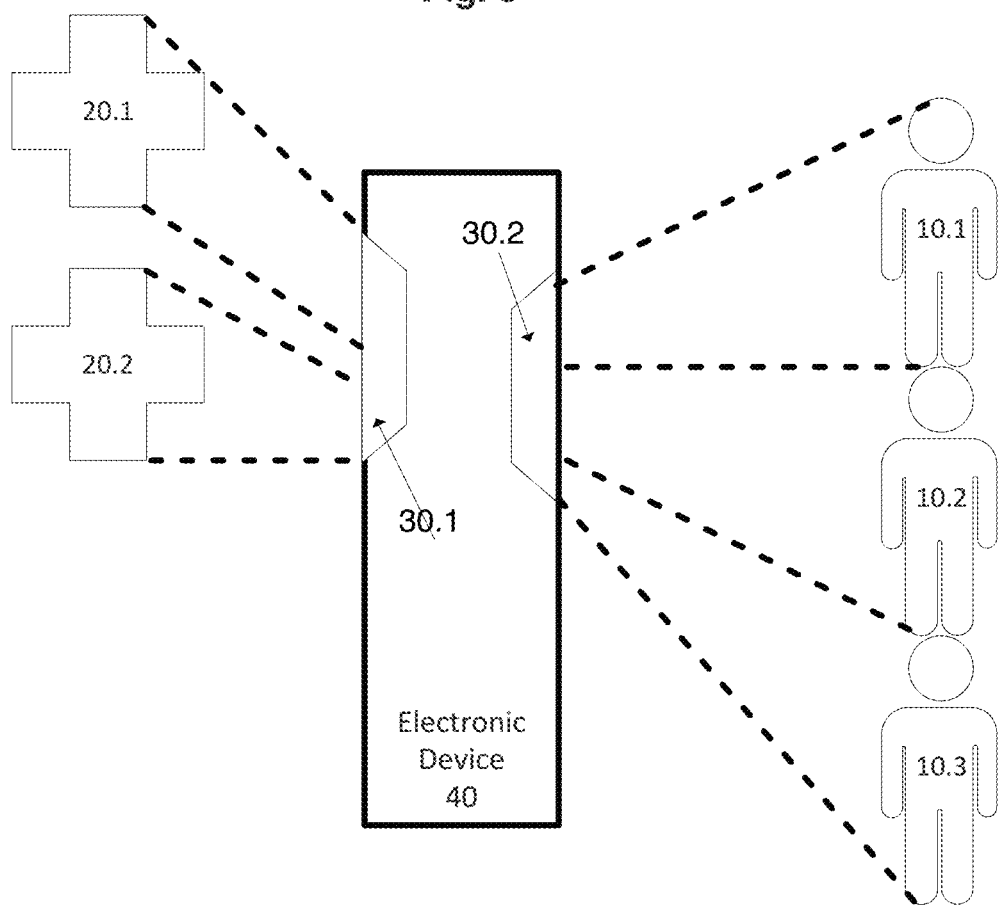
FIG. 5 is a top view of electronic host device showing multiple target imaging areas.

Turning to FIG. 5, FIG. 5 is an embodiment such as the host electronic device 40 is typical of a smartphone. The metalens 30.1, having at least two portions, can view the cross 20.2 in the traditional prior art of taking a picture from the rear camera for "personal" consumption (i.e., viewed by people) using traditional imaging optics. The other cross 20.1 goes through the other portion of the metalens 30.1, both "focusing" the image onto the image sensor (not shown) such that this other portion can leverage either imaging optics or non-imaging optics. A fundamental feature of the invention is such that objects seen such as the shown cross 20.1 are used while the user of the smartphone is walking while looking at the front of the smartphone. In this mode, the camera is traditionally NOT used at all yet the user is significantly safety impaired while walking due to distraction of using the smartphone. Objects, indicated by cross 20.1 as seen provide enhanced safety to the user by detection of safety relevant objects (e.g., traffic signals, other pedestrians, barrier objects, vehicles whether moving or not moving, etc.). The front camera having image captured as transmitted through metalens 30.2 having, as indicated 3 portions, such that front camera angle becomes decoupled to the viewer (also object in which the camera captures) user interface display viewing angle. The traditional viewing of front camera is of object (i.e., person) 10.1. However, in most instances the user interface display is not perpendicular (or not as much as desired) to the camera subject and thus the optimal user viewing angle or camera capture image are not BOTH achieved concurrently. The fundamental purpose of the front camera is such that each portion of the metalens must be of imaging optics, as the image is predominantly utilized for personal viewing whether local or remote.

Figure 6:
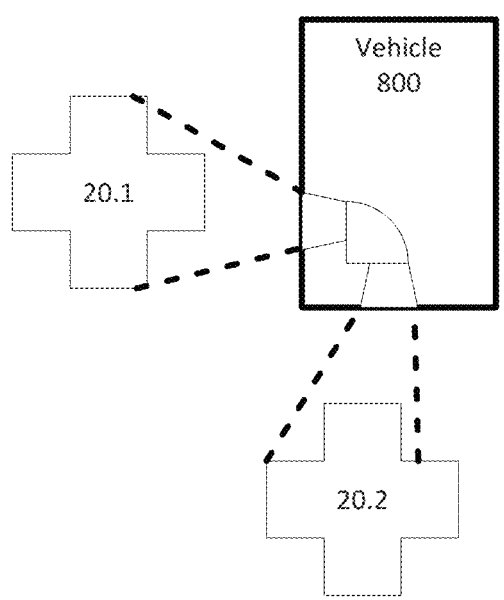
FIG. 6 is a top view of multiple target imaging areas within a host vehicle.
Figure 20:
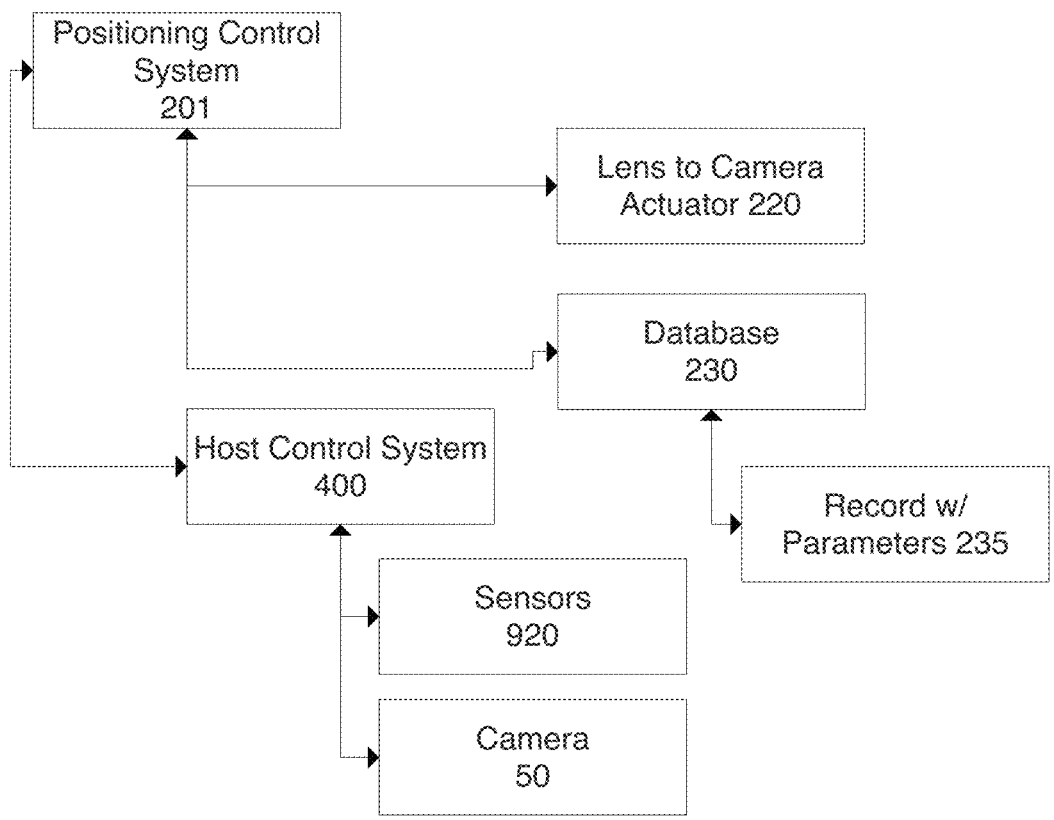
FIG. 20 is an object-oriented structure of the imaging system integrated with a host control system.

Turning to FIG. 6, FIG. 6 is an embodiment in a vehicle 800, though not restricted to the shown integration of the (at least) two portion metalens into both a side facing and rear facing perspective (i.e., at least greater than a 45 degree offset angle, and preferably at least a 90 degree offset angle) to see the side facing object 20.1 and the rear facing object 20.2 supported using image correcting optics into a singular image sensor (optics and sensor not shown). The vehicle control system (as shown in FIG. 20) can switch between the two metalens portions in accordance to vehicle operating modes. An operating mode of "remain in lane" leverages the rear facing sight of object 20.2 as the primary image as the most critical control algorithms are speed control, which includes braking, that is a function of both forward facing (not shown) and rear facing such that the distance and velocity of an object 20.2 (e.g., another vehicle) is a factor in the control of brake lights (even if independent of actual braking, but for signaling purposes), distance between this vehicle 800 and a forward facing vehicle, and even optionally factoring in the distance between this vehicle 800 and a rear facing vehicle. Placement of the metalens within the tail light "panel" is optimal from an aesthetic, economic and performance perspective though is anticipated to also be within the vehicle body.

Figure 7:
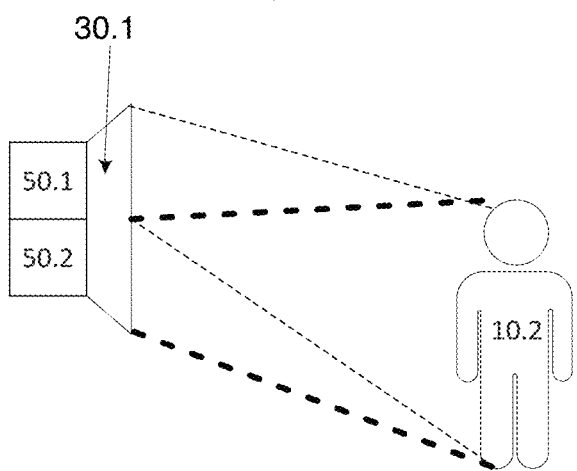
FIG. 7 is another top view of multiple metalens portions.

Turning to FIG. 7, FIG. 7 depicts a metalens 30.1 having two distinct optics in parallel (parallel meaning ability to utilize either without any removal of either metalens portions within the singular metalens. It is understood that the significant reduction in optics depth as well as optics size distinctly enables the direct integration of imaging sensors 50.1 and 50.2 such that each imaging sensor can take on a distinct function (e.g., parallax, infrared sensor, visible) sensor as one integrated imaging system. Though not shown, an image modifier (such as shown in FIG. 9 98.1) can modify the light spectrum through known measures such as optical filters, down-converting through quantum dots, or even up-converting such that superior image analysis achieves improved system performance (e.g., distance measurement, acceleration/deceleration measurement, color determination, object identification, etc.). The image modifier also includes quantitative numerical adjustment measures as known in the art to calculate or account for deviations within non-imaging optics into a predictable assessment of object location within the imaging sensor. The ability to utilize two lens portions in rapid succession (due to very high, relative to mechanical, switching speeds between the respective lens portions (preferably through electronic switching that occurs faster than 300 milliseconds "ms", preferably faster than 120 ms, and particularly faster than 100 ms) of image blocker 95.1 as shown in FIG. 9) provides distant accuracy improvements by at least 5%, preferably by at least 50% as compared to distant errors realized when only using a single lens (whether it be traditional or even metalens). The image sensor 50.1 can also simply leverage micro-actuator or preferably MEMS actuator to achieve parallax imaging as the actuator sequences between position 50.1 and 50.2 of the image sensor and the asymmetrical convergence of image to a distance between positions 50.1 and 50.2 at least 50% less than the distance between two positions based on symmetrical traditional non-metalens optics. The darker dashed lines depict the optical path of object 10.2 (e.g., person, or vehicle) as captured by the metalens into imaging sensor 50.2 (or $2^{nd}$ position), and respectively the lighter dashed lines depict the optical path of object 10.2 as captured by the metalens into imaging sensor 50.1 (or $1^{st}$ position). It is understood that with the addition of an image blocker (as shown on FIG. 9, 95.1) the optical path of each metalens portion can overlap such that the image blocker actively blocks the portion of the image that otherwise would be overlaid improperly as a double exposure to enable a further at least 20% reduction in distance between the position 50.1 and 50.2 relative to distance without overlapping image convergence on image sensor(s). The optimal use of image blocker enables the positions 50.1 and 50.2 to become identical and therefore no actuator is required to move the imaging sensor.

Figure 8:
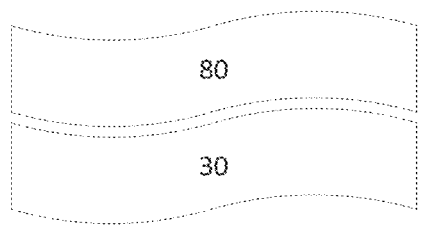
FIG. 8 is a top view of metalens shape matching a host device exterior surface.

Turning to FIG. 8, FIG. 8 depicts a metalens 30 directly conforming (i.e., meaning that metalens follows the contours of the exterior surface within a deviation or gap of less than 100 microns, preferably less than 10 microns, and particularly preferred of less than 2 microns) to an exterior surface 80, such as the shape of a vehicle body/fuselage. The ability of the metalens to have optics practically independent (relative to traditional optics) of depth enables the metalens to create either imaging or non-imaging optics, with or without image modifier (98.1, FIG. 9) for as known in the art camera or sensor performance particularly as it relates to a semi-autonomous or autonomous vehicle. The shape of the exterior surface 80 can be virtually any non-linear or linear shape.

Figure 10:
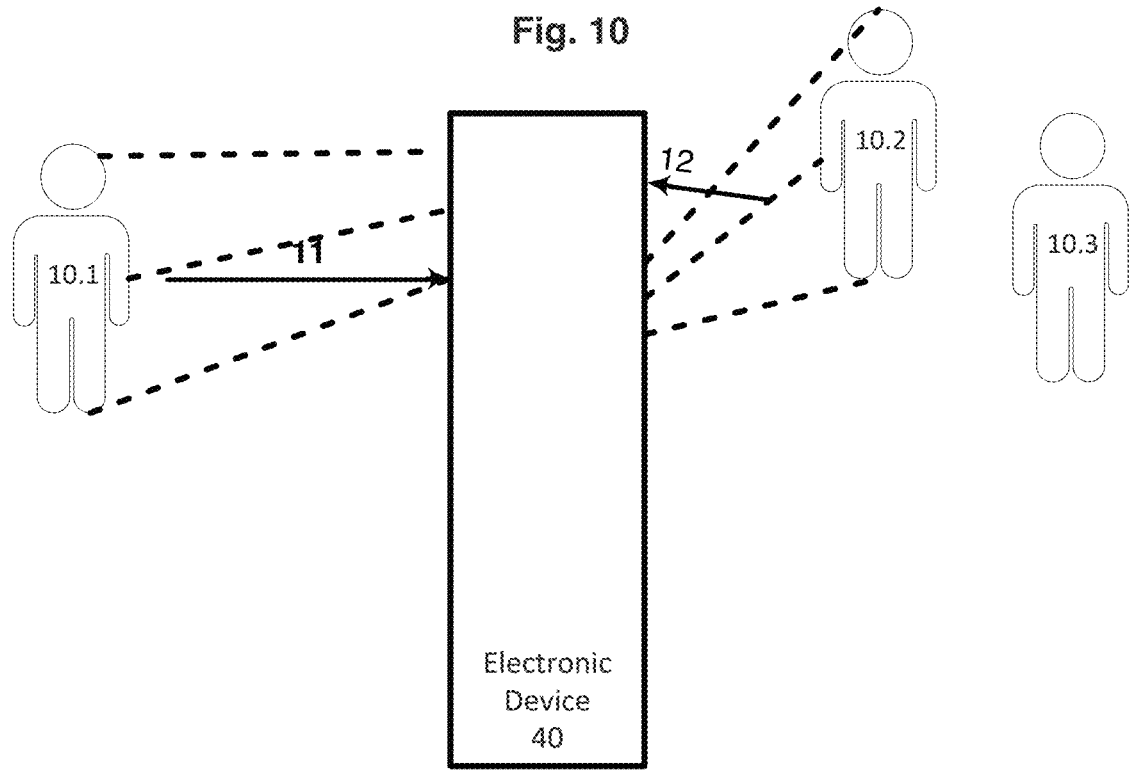
FIG. 10 is a top view of electronic host device showing varying image angles.
Figure 12:
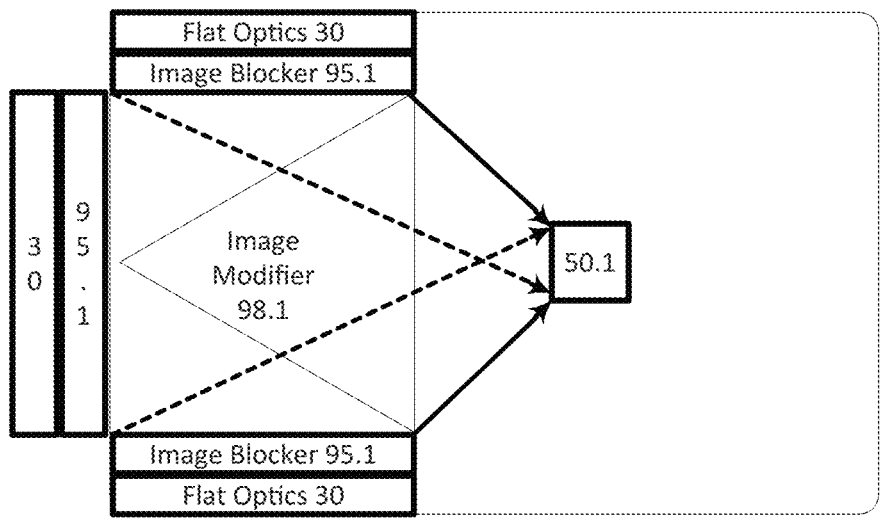
FIG. 12 is another top view of a singular imaging sensor supporting multiple metalens for imaging.

Turning to FIG. 9, FIG. 9 depicts a preferred optical sequence from the metalens 30 (as closest to the object(s) to be imaged) to the imaging sensor 50.1. It is understood that the placement of an image modifier 98.1 (as well as 98.2) or image blocker 95.1 (as well as 95.2) can be in any relative sequence in terms of flat optics/metalens 30 and the image sensor 50.1. This embodiment depicts overlapping images as shown by the darker dashed lines into the image sensor 50.1 after transmitting through the $1^{st}$ portion of the metalens (and then image modifier 98.1 and image blocker 95.1) whereas the lighter dashed lines respectively into 98.2 and 95.2. The primary function of the image modifier (98.1 and 98.2) is to manipulate the image, whether it be a second metalens to standardize the image pattern onto the image sensor 50.1 beyond what a single layer metalens 30 can achieve or other functions as known in the art including filters, converging or diverging lens, etc. The primary function of the image blocker (95.1 and 95.2) is to prevent (or at least limit by 80%, preferably by at least 95%) any optical path of the $2^{nd}$ portion of the metalens reaching the imaging sensor when the first portion of the metalens is active (or vice versa). A preferred image blocker is based on the as known in the art use optical absorbers including of thin-film liquid crystal (switchable mirror) organic light-emitting diode "OLED" on black color, electrochromic, MEMS mirrors also known as micromirrors (in which placement would vary as known in the art), or even micro-actuator control of ultra-high emissivity coatings. It is further understood that additional optical elements can be placed anywhere in between the metalens and the imaging sensor to further alter the image, whether it be in an imaging or non-imaging optical manner (though always repeatable and predictable). It is an important aspect of the invention as depicted in their respective figures whether the lens system is comprised of multiple flat optical elements 30 in which the flat optical element is comprised of a single lens segment or multiple lens segments 30.1 and 30.2 within a single flat optical element, the multiple flat optical elements and/or the multiple lens segments remain in fixed position to each other. The distinct capabilities of the invention are due to the flat (and thin) optical element and further the optical element taking concurrent advantage of both an imaging and non-imaging optical segment. The distinct optical properties of the invention enable the switching of source images onto a singular target imaging sensor with minimal movement of the imaging sensor or preferably through a purely electronic imaging blocker for each of the lens segments. It is understood that at least a first lens segment (as shown in FIG. 3 object 30.1) and a second lens segment (as shown in FIG. 3 object 30.2) can be adjoining onto a single flat continuous optical element 30 or the aggregate of multiple flat optical elements (as shown in FIG. 12 each instance of 30). The imaging optics lens is at a first imaging optics position and the non-imaging optics lens is at a second position with the respective positions being stationary relative to each other throughout the operation of the invention. The aggregate of the imaging optics lens and the at least one non-imaging optics lens is a lens system where the lens system comprised of its multiple segments remains stationary as well and the only movement is of the target imaging sensor relative to the lens system or preferably the target imaging sensor also remains stationary relative to the lens system by switching the transmissibility of the light radiation from each respective lens source image onto the target imaging sensor, Turning to FIG. 10, FIG. 10 depicts a traditional prior art optics for an electronic device 40 (e.g., smartphone, camera, etc.) such as the forward-facing camera having a typically perpendicular optical path as represented by vector 11 to create an imaging optic (i.e., without distortion, etc.) of object 10.1 for the typical capturing of a photograph (or video) having primary function of sharing the image with other people (or for archival purposes). The rear facing camera typically has a slightly off perpendicular optical path as represented by vector 12 capturing the image of object 10.2.

Figure 11:
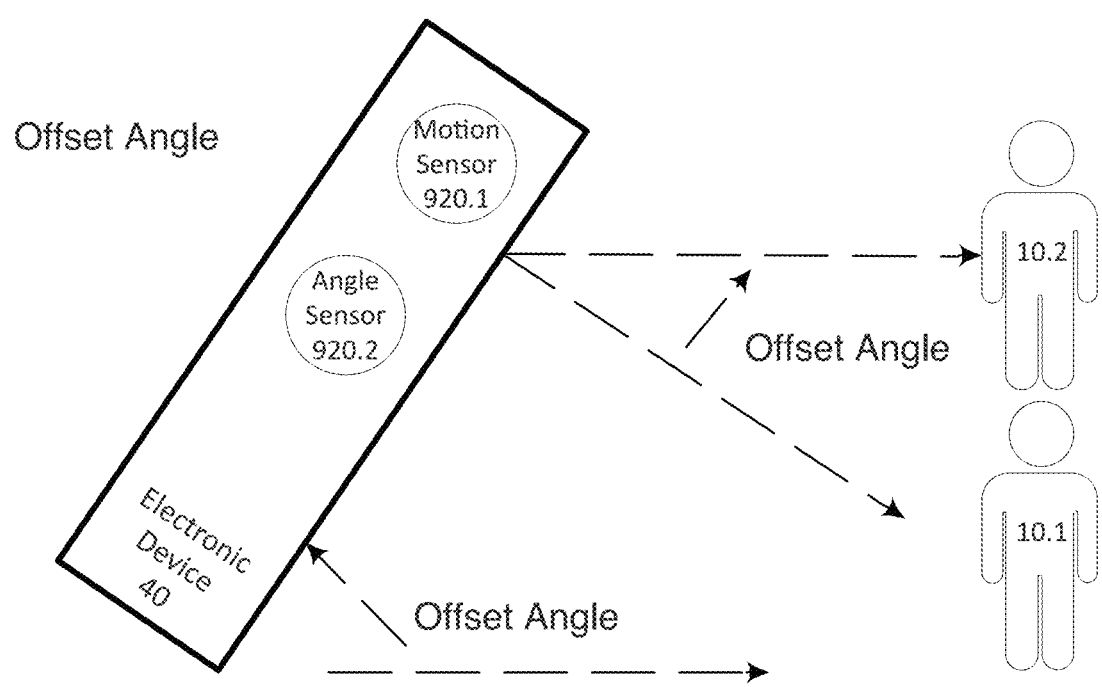
FIG. 11 is another top view of electronic host device showing both internal components and image offset angles.

Turning to FIG. 11, FIG. 11 depicts an electronic device 40 further comprised of a motion sensor 920.1 (as known in the art to include gyro, etc.) and an angle sensor 920.2. It is understood that the angle can solely be calculated using the combination of software and hardware as known in the art. The inventive use of the angle is to calculate an offset angle between a primary optical position, such as optical path to see object 10.1, with the optical path to see object 10.2. The offset angle is utilized to determine what portion of the metalens becomes active, or the placement of the imaging sensor relative to the active metalens portion such that imaging sensor achieves a superior image of the object as depicted by object 10.2 relative to the electronic device 40. It is a further inventive embodiment that the electronic device 40 has/enters into a traveling mode such that while in traveling mode the rear facing camera (otherwise in an inactive or even powered down mode) becomes active. The combination of software and hardware (e.g., motion and angle sensors) in combination with known (or projected) location (e.g., GPS, whether indoor or outdoor) provides image analysis to alert user of electronic device 40 of a wide range of upcoming issues/concerns in event that the user continues to travel in the current direction (or projected direction in the event the electronic device 40 has knowledge of destination). Such issues/concerns include walking into an active street while traffic signal is red, holes in the sidewalk, etc. Another embodiment of the metalens within an electronic device (e.g., camera, smartphone, etc.) is the electronic device having two supporting metalens portions/positions, with the first portion being a standard first imaging optical lens and the second portion being an at least second portion also being an imaging optical lens such that the second portion has an offset angle (whether it be in the vertical plane as shown, or in the horizontal plane). The second portion is utilized when the electronic device is in a secrecy/privacy mode, such that the secrecy mode enables the user of the electronic device to capture an image of an object (i.e. a person) where the offset angle is at least 10 degrees and the offset angle reduces/eliminates the appearance of the user taking a photograph/video to the object being image captured. It is understood that the metalens can consist of multiple optical portions such that the electronic device 40 user has the ability to activate a specific portion of the metalens to capture the image of the object such that the object captured reduces/minimizes/eliminates the requirement for the electronic device to be perpendicular to the object having its image captured. One such embodiment is such that the smartphone has a rotating or sliding meta-lens enabling rapid imaging between the primary metalens portion/position (i.e., at a perpendicular position relative to the object being imaged) takes a photograph (or video, used interchangeably) straight onto subject (and provides best quality image) and a secondary metalens portion/position. Another embodiment is such that the second metalens portion is at a significant angle from the object/subject to enable a second picture to be taken in rapid sequence such as in a sporting event without having to turn the electronic device 40 or user body enabling the athlete to stay within the field of vision.

Turning to FIG. 12, FIG. 12 is another embodiment (top view) showing an expanded view of an imaging system, such as anticipated in a moving vehicle (used interchangeably with the term automotive, recognizing this vehicle could be a bus, truck, or automated guide vehicle "AGV"), such that a single imaging sensor 50.1 supports at least two (as shown three) metalens each having a distinct optical path (in this instance, 1 rear facing, 1 side facing, and 1 forward facing) with the rear facing metalens portion providing a primary imaging optics to the user (in this instance a driver of the vehicle if not autonomous) or forward facing being the primary imaging optics in the event of an autonomous or semi-autonomous vehicle. Each portion of the metalens 30 has an integral image blocker 95.1. As shown a single image modifier 98.1 is used to converge respectively the optical path of each image onto the imaging sensor 50.1. Each of the metalens portions can be either imaging or non-imaging optics, and as understood (particularly in a semi-autonomous vehicle) the side facing and forward facing portions can leverage non-imaging optics as the vehicle will have substantial image analysis all of which can concurrently correct/modify for any or all image defects/non-linearities into a well-defined predictable image (e.g., the physical placement of a first object relative to an at least second object, such that the image analysis defines the relative position and distance between the first object and the at least second object) is provided to the host control system 400 (not shown in this figure).

Figure 13:
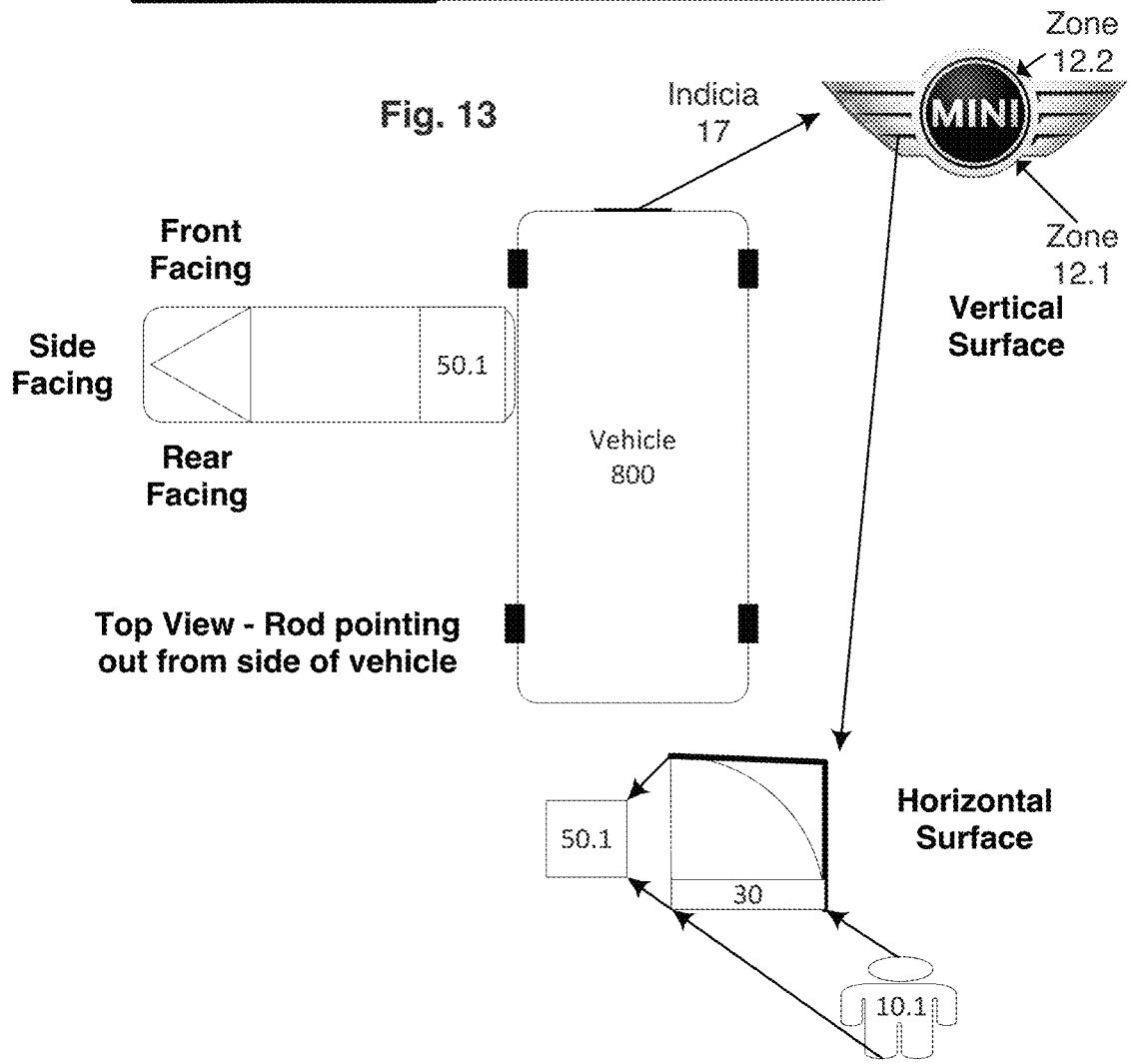
FIG. 13 is a top view of a vehicle host device with indicia having embedded camera and metalens.

Turning to FIG. 13, FIG. 13 is an embodiment with the imaging system as shown in FIG. 12 in a vehicle 800. The placement of the imaging system, though shown to take the place of a typical rear view mirror, can be anywhere on the vehicle body. A preferable position is a protrusion from tail gate lighting panel or head light panel to enable a true 360-degree view of the vehicle using a substantially reduced set of imaging sensors as compared to a non-metalens optical system. Another embodiment of the metalens is the integration of the imaging system directly into the vehicle indicia 17. It is a fundamental goal of the invention to decrease the visibility of the imaging system, to decrease aerodynamic impact of the imaging system, and to reduce the requirement of the imaging system to move into an operating mode (such that a retracted mode is used predominantly for keeping the imaging system clean of dust, dirt, ice, etc.). In this exemplary indicia (of the Mini) it is shown that two distinct metalens portions (zone 12.1 and zone 12.2) in a vertical surface configuration fit within indicia without any significant visual modifications as compared to a non-integral indicia. The utilization of the image blocker, and/or exterior color matching layer 805 (as shown on FIG. 18) enables the imaging system to match the color within the indicia. The image blocker, depending on vehicle mode, can have a default position of being in the image blocking mode (of both metalens portions/zones) during operating of the vehicle when "marketing" is able to take precedence over safety (e.g., at a red light, prior to driver/passenger entering the vehicle, etc.). Yet another embodiment is in a horizontal surface such that a metalens 30 with an optional image modifier 98.1 (can be replaced by an optical light-guide) projects the optical path onto an imaging sensor 50.1. In this instance, the imaging system is both well camouflaged and has a substantial reduction of dust, dirt, ice, etc. accumulation due to the indicia surface being a partial shield to the metalens.

Figure 14:
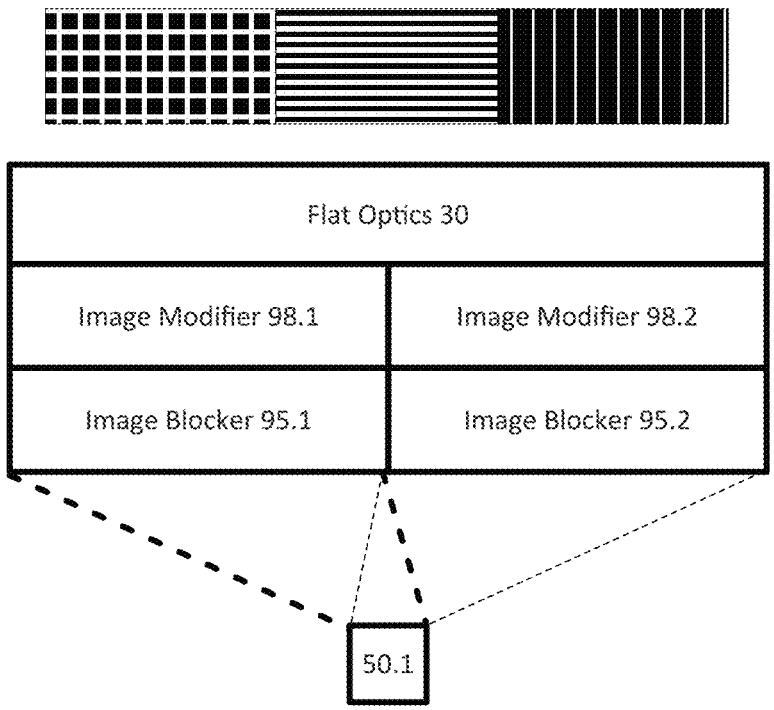
FIG. 14 is a view of resulting images from multiple imaging and non-imaging optics.
Figure 14:
Figure 14:
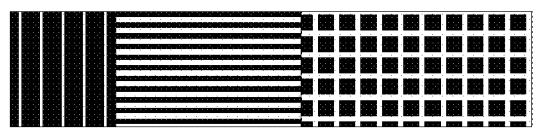
Figure 14:
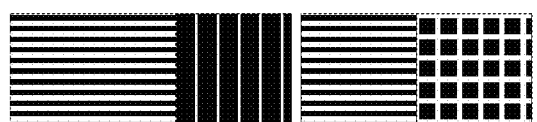

Turning to FIG. 14, FIG. 14 depicts a representative imaging optics and two instances of non-imaging optics. The imaging system components are identical to FIG. 9. However, Example A shows an imaging optic in which the left to right is reversed as seen on the imaging sensor. Example B shows a non-imaging optic that also reverses the image and concurrently yields a non-linear skewing of the image. Example C shows another non-imaging optic in which portions of the image are skewed in addition to selective left right offset. It is understood within the accepted terms of non-imaging optics that predictable/repeatable alterations are made to the image as compared to a traditional imaging optics as typically used in electronic devices and vehicle applications. This FIG. 14 clearly depicts how the source image (shown above the flat optics 30) when the flat optic 30 is an imaging optic yields the represented target imaging sensor image of Example A. Examples B and C represent target imaging sensor images when the flat optic 30 is a non-imaging optic.

Figure 15:
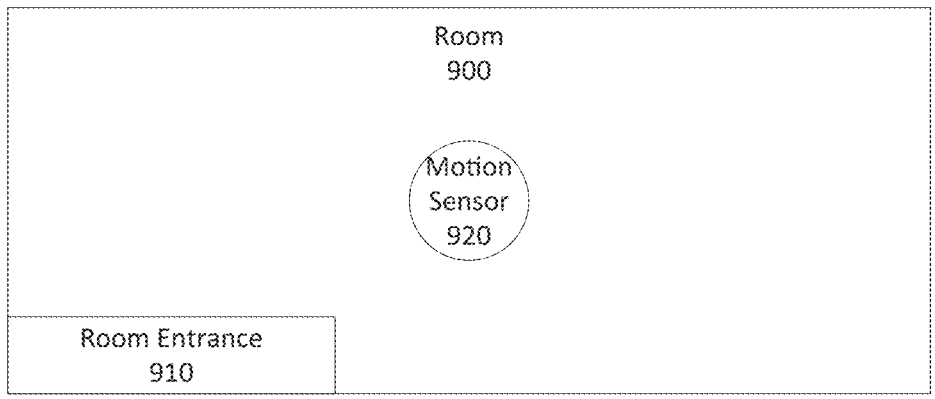
FIG. 15 is a top view of the imaging system operating as a motion sensor within a room.
Figure 15:
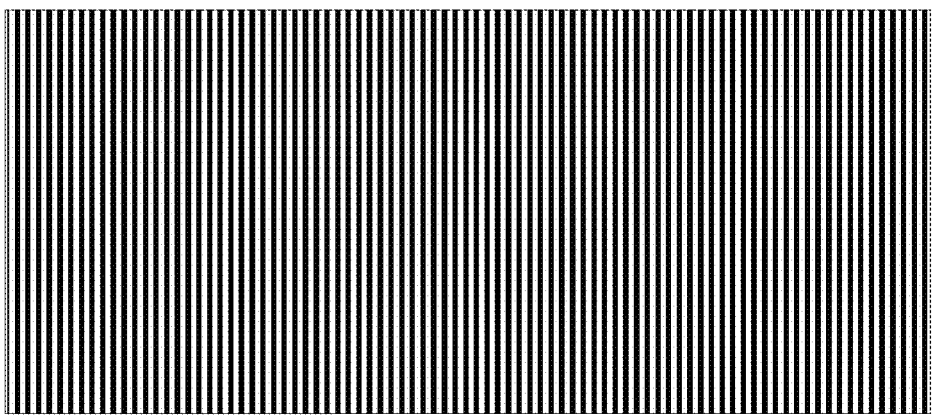
Figure 15:
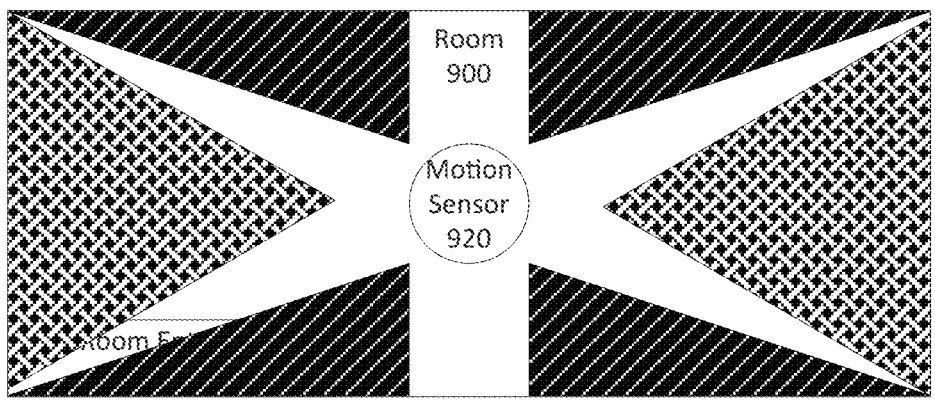

Turning to FIG. 15, FIG. 15 is an embodiment of the imaging system operating as an advance motion sensor 920 such the imaging system leverages the metalens capability to: 1) increase accuracy (reducing error by at least 5%, preferably at least 50%), with concurrent location determination, of the imaging sensor to enable more sophisticated control actions including selected image variations depending on operating mode (inclusive of vacant, occupied, location tracking, etc.); 2) location tracking such that the metalens portion is varied from a full area (i.e., the entire room 900) to individual focused/concentrated zones (represented by different textured shapes). One instance is the concentrated zone overlaying the room entrance 910 exemplary of when the room 900 is vacant, where the concentrated zone also enables precise tracking of the object (i.e., person) entering the room especially when coupled with the use of identifying wireless transmitters from the object with signal strength variations upon entering/leaving the room. The result is object color matching/tracking to provide location analysis even in the absence (or reduced accuracy) of wireless transmitters.

Figure 16:
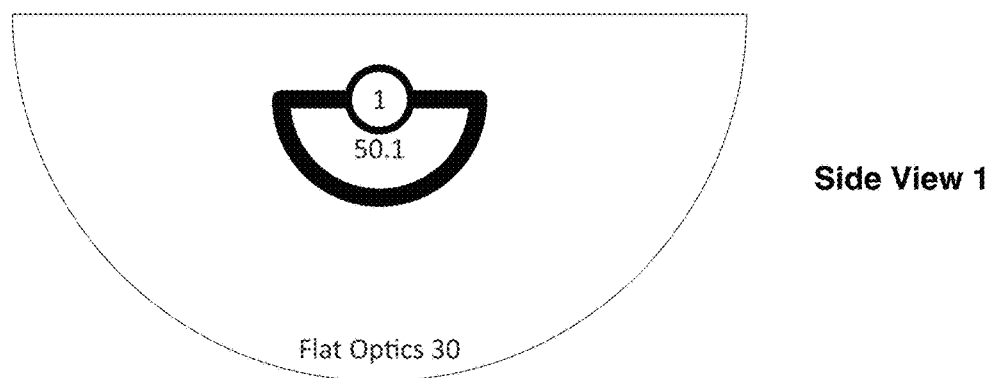
FIG. 16 is a side view of the imaging system with metalens in a non-flat configuration.

Turning to FIG. 16, FIG. 16 is an embodiment showing an imaging sensor 50.1, leveraging the very compact size of metalens optics 30, rotating on a shaft 1. The very compact size of the imaging system enables a very economical micro-actuator (or micro-motor) to be utilized in covering the entire imaging range of the metalens with the multiple imaging portions. Furthermore, the metalens enables scanning of an entire room/zone using a linear imaging sensor 50.1 with very low cost, yet high precision. Though not shown, it is understood that the image blocker and/or image modifier can be included in this embodiment.

Figure 17:
FIG. 17 is another side view of the imaging system with metalens in both a non-flat configuration and with multiple imaging portions.
Figure 17:
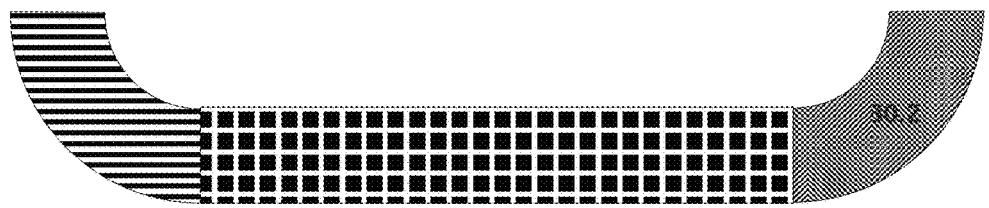

Turning to FIG. 17, FIG. 17 is an embodiment like FIG. 16 where the first metalens portion 30.1 enables imaging to take place through variations of an exterior image modifier as indicated by different textures. In this embodiment, the metalens enables the entire imaging system to maintain a very low profile and for the metalens to have varying optical convergence/divergence paths within the imaging system. The different textures are representative of different portions within a second metalens 30.2.

Figure 18:
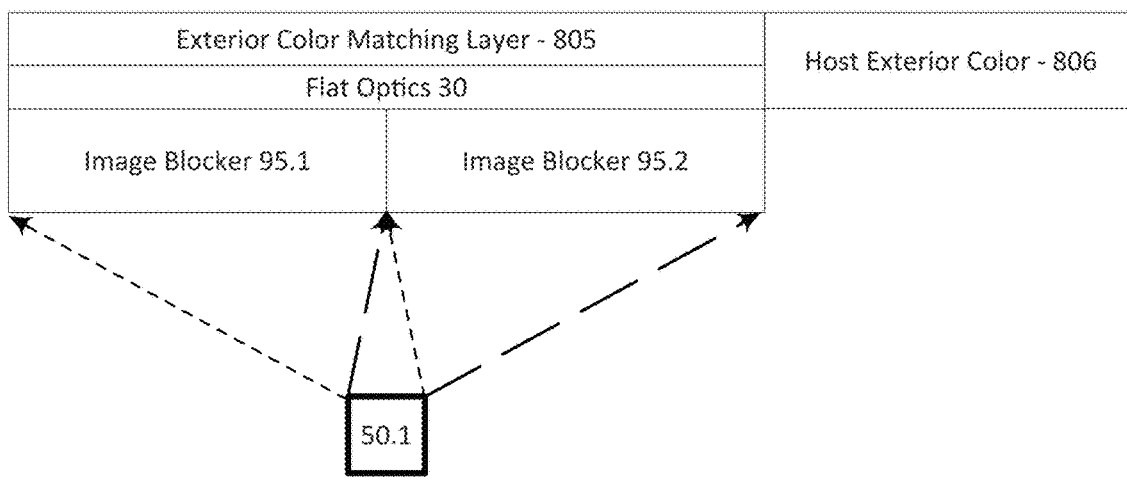
FIG. 18 is another side view of the imaging system with metalens and host system color matching.

Turning to FIG. 18, FIG. 18 is an embodiment such that the metalens 30 has an additional switchable (on/off) exterior color matching layer 805 (it is understood that due to the thinness of the metalens, placement of 805 can be underneath the metalens 30, to provide precise color matching with the host (electronic device, or vehicle, or natural object) exterior color 806 so as to camouflage the imaging system from within the host environment. The balance of the components, including the image sensor 50.1 and image blocker (95.1 and 95.2) serve the same function as in other figures. It is understood that the exterior color matching layer 805 can be achieved using means as known in the art ranging from OLED, light-guide, electrochromic mirror, etc. Another feature is color matching layer 805 operating as a selective light filter or light amplifier to respectively decrease the adverse light impact on the balance of the imaging system components (i.e., from UV, IR light) or increase the light passing through the metalens (further enabling a surface size reduction) providing superior camouflaging opportunities due to reduced metalens (and overall size reduction of entire imaging system) by at least 10% (and preferably by at least 80%) as compared to without light amplifier (as known in the art).

Figure 19:
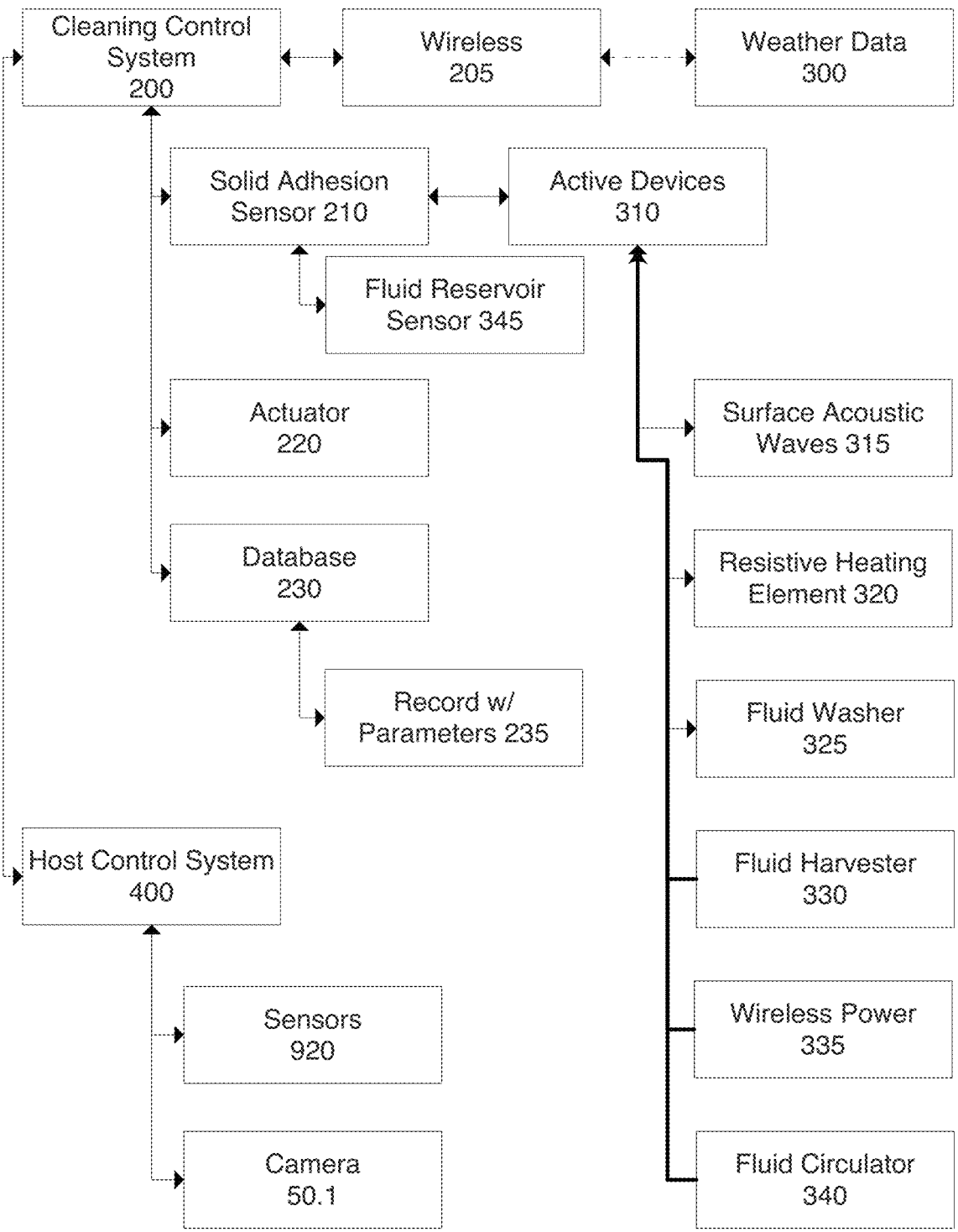
FIG. 19 is an object-oriented structure of the imaging system integrated with a cleaning control system.
Figure 23:
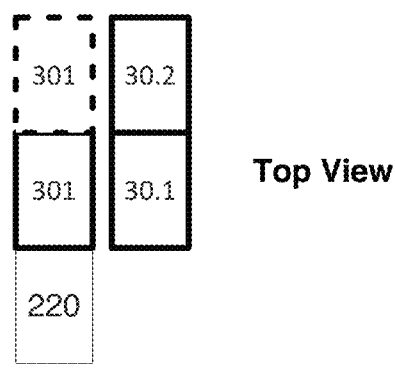
FIG. 23 is a top view of the imaging system with multiple imaging portions integrated into the cleaning system.

Turning to FIG. 19, FIG. 19 is an embodiment of a control system that integrates the host control system 400 for precise control of the imaging system (comprised of all components, notably active controllable elements being imaging sensor 50.1 in combination with other sensors 920 as known in the art that provide either logic parameters or feedback for operating of the active components within the imaging system. One such integration, as shown, is with the cleaning control system 200. As noted in other figures, the metalens size (and optical properties) enable a much more dynamic (as compared to non-metalens optics) and controllable environment in which the imaging system operates in. The small size enabled by the metalens, particularly with the light sensitivity amplifier, places additional demands on keeping the exterior (environment facing) lens or coating (or other functional layer) clean as the relative size of dust, dirt, frost, ice, etc. is larger (versus non-metalens applications) to the imaging sensor size. The cleaning control system uniquely leverages both traditional cameras and the notable inventive metalens imaging system to obtain real-time images (that can be from the first imaging system to be cleaned by the cleaning system, or a second imaging system at a different location) that provides cleaning parameters specifically indicative of real-time weather conditions that becomes even more potent when combined with weather data 300 obtained by wireless 205 communication means as known in the art. The imaging system itself, as known in the art, can be the solid adhesion sensor 210 or a distinct sensor can operate in that capacity such as surface acoustic waves 315. The metalens having multiple portions or the movement of the imaging system uniquely enables the image at the first position to be compared to the second position (within the same "window") to provide definitive confirmation and location of any solids that have adhered to the exterior layer. Returning to the logic for cleaning, the small size of the metalens makes it uniquely practical to have a fluid reservoir further comprising a fluid reservoir sensor 345 to detect the presence of fluid. Another inventive feature is the control of an optional fluid containment cover 301 (as shown in FIG. 23) to enable recycling/reuse/recovery of the fluid to minimize the fluid reservoir size such that the cover 301 is placed over the non-active metalens portion, and the control system further enables the cleaning cycle to begin for that non-active metalens portion using an actuator 220. The cleaning control system 200 is further comprised of a database having data records with control parameters 235. A wide range of active devices 310 are controlled and enabled practical (again due to reduced size) including surface acoustic waves 315 on the exterior layer to further reduce dust/dirt adhesion, resistive heating elements 320 (notably transparent materials including carbon nanotubes or preferably carbon nanotube networks as known in the art of conductive polymers/materials) to reduce ice adhesion or to eliminate ice bridging over the optical "window" (i.e., metalens). The fluid washer 325 is controlled as known in the art to include pump (or piezoelectric pump/fan) to recirculate preferably fluid (i.e., condensed water from the atmosphere) as harvested by fluid harvester 330. The cleaning control system also regulates power to the electrically powered components through a wireless power 335 device such that no holes are required to transmit power from inside the host system (e.g., vehicle) to outside of the windshield where cleaning components are placed. The fluid circulator 340 enables recirculation of fluid from either the reservoir or fluid harvester to minimize the fluid requirement (and/or fluid reservoir size).

Turning to FIG. 20, FIG. 20 is a portion of the overall control system dedicated to positioning control system 201 responsible for positioning of the imaging sensor 50 relative to the metalens via an actuator 220. A database 230 with data records with parameters 235 is utilized to coordinate with known modes of operation for the host (e.g., electronic device 40, vehicle 800, etc.). Additional sensors 920 as available from the host control system 400 are appropriately leveraged.

Figure 21:
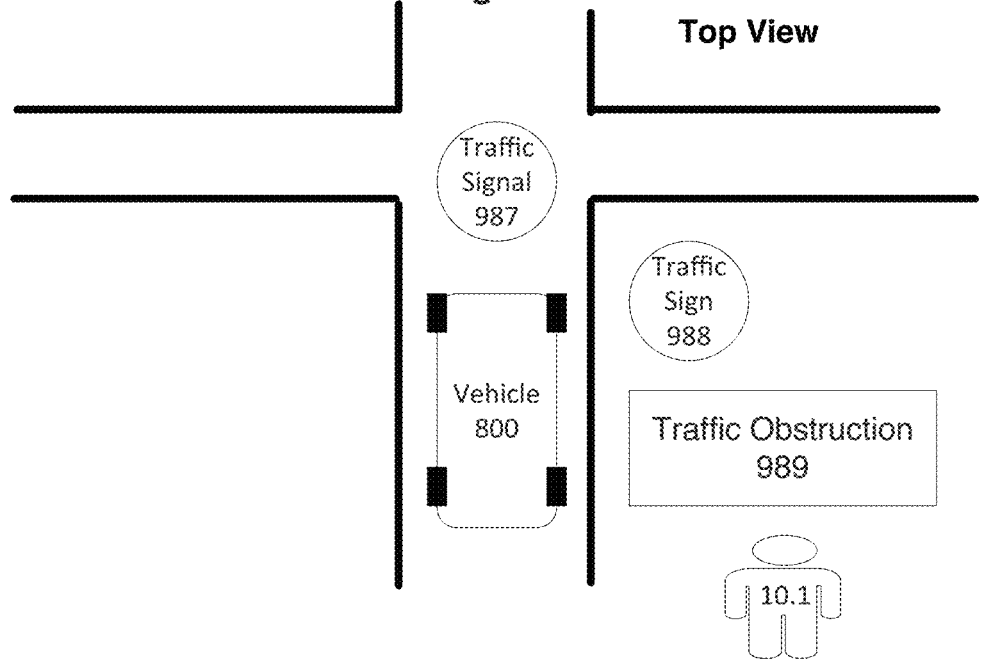
FIG. 21 is a top view of a street for the personal user of a host electronic system with integrated imaging system.

Turning to FIG. 21, FIG. 21 depicts the user of the host device (e.g., electronic device such as a smartphone) in the top view of a typical street scenario where the street has vehicles 800, traffic signs 988, and traffic signals 987 all critically important to establishing the presence of traffic obstructions 989 while the imaging system is leveraging the second portion of the metalens (i.e., non-primary) and any corresponding actions in which the user needs to take precautionary actions. It is recognized within the scope of the invention that such precautionary actions will be signaled to the user whether it be through audio means, visual means on the user interface, or vibrating modes as known in the art. The precautionary actions can be visual or auditory signals as known in the art.

Figure 22:
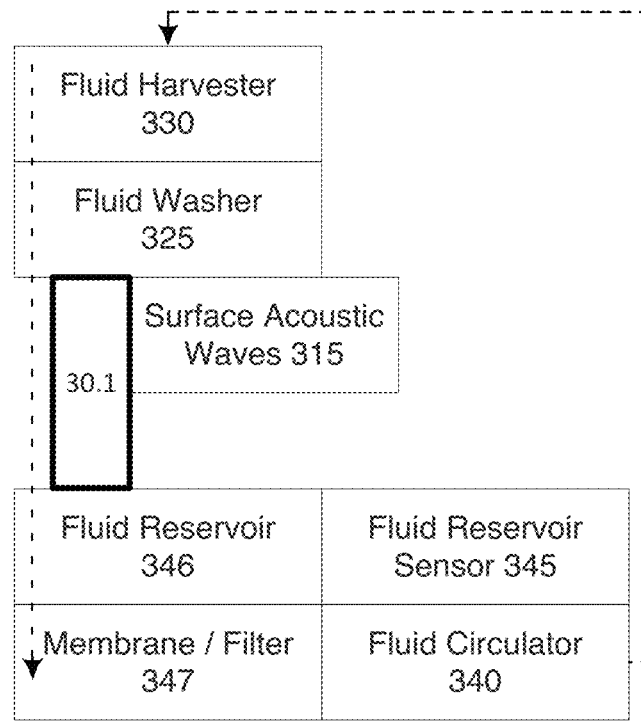
FIG. 22 is a side view of the imaging system with integrated cleaning system.

Turning to FIG. 22, FIG. 22 is a side view of the imaging system having metalens 30.1 with the integrated cleaning system components. The positioning of the fluid harvester 330 is ideally situated above the metalens, which enables a completely passive cleaning system to be realized as condensation enhancing coatings as known in the art makeup the critical element of the harvester, but also active cleaning system such that fluid harvested can pass into the fluid reservoir 346 (placed below the metalens). The fluid washer 325 is comprised of further fluid handling/channeling components as known in the art. The optional surface acoustic wave 315 generator, enabled by the very small metalens size, places acoustic waves onto the exterior side of the metalens to further displace dust, dirt, etc. from the surface even when superomniphobic coatings as known in the art are utilized. The fluid circulator 340 uses either inherent feedback to determine presence of fluid or the fluid reservoir sensor 345. An important feature of the inventive cleaning system is a membrane/filter in which dust, dirt, etc. doesn't pass through (yet remains non-fouling to the membrane by leveraging coatings having negligible solid adhesion) to enable fluid recycling/recovery.

Turning to FIG. 23, FIG. 23 is a top view of an optional cover 301 for the specific inventive purpose of containing the fluid enabling virtually complete fluid recovery. The earlier mentioned resistive heating element can double functionality to prevent fluid from freezing in the reservoir (particularly when fluid is diluted by water harvested, i.e., without any anti-freeze). The cover is moved by an actuator 220, preferably a micro-actuator, so that the cover is over the inactive portion of the metalens 30.1 (for the solid line positioned cover 301) and then moved to the second position 30.2 as indicated by the dashed line positioned cover 301 respectively.

Figure 24:
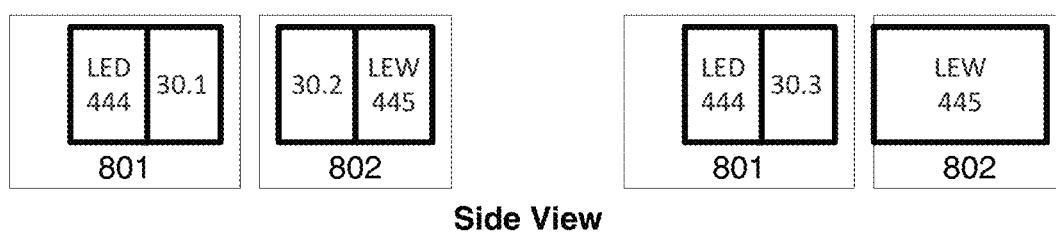
FIG. 24 is a side view of a metalens enabling light gap filling.

Turning to FIG. 24, FIG. 24 is another embodiment of metalens for non-imaging optic applications with benefits substantially greater than its ability to have an ultra-thin lens. One exemplary implementation is a vehicle trunk (or hood) where lighting is required in both side body panel placed lighting emitting and trunk lighting emitting BUT it is substantially advantageous to be void of electrical power in the relative moving trunk (to the side panel). The metalens minimizes undesirable light emitting (and associated losses) as the light optical path goes from LED 444 (light source) through the metalens 30.1 all on the side panel 801 then passing through the gap between the side panel 801 and the trunk/hood 802 that has a "receiving" metalens 30.2 transmitting light to the light emitting waveguide (a.k.a. lightguide) 445. A second embodiment eliminates the "receiving" metalens and solely uses a singular "transmitting" metalens 30.3 between the LED 444 (light source) and the emitter LEW 445. The use of a metalens can enhance the performance of virtually any instance in which an LED array is utilized with lighting transmission through either a traditional waveguide or "air" guide. Analogous instances exist in virtually any moving vehicle.

Figure 25:
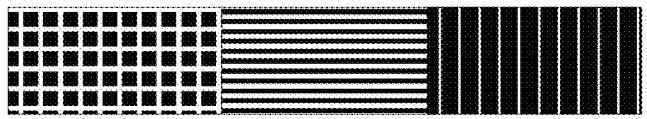
FIG. 25 is a view of resulting images from multiple imaging and non-imaging optics having more detailed representation of imaging embodiment and non-imaging embodiment of FIG. 14.
Figure 25:
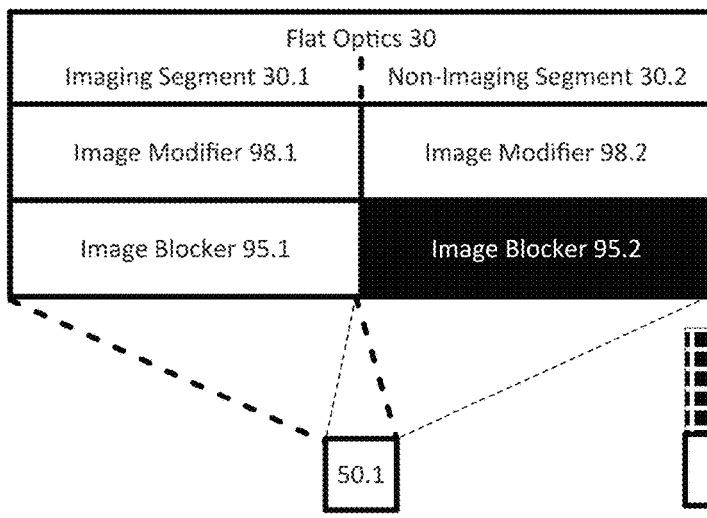
Figure 25:
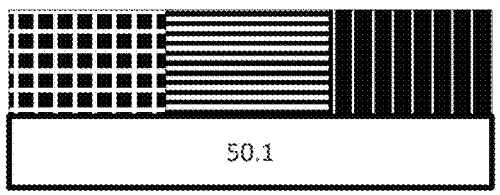
Figure 25:
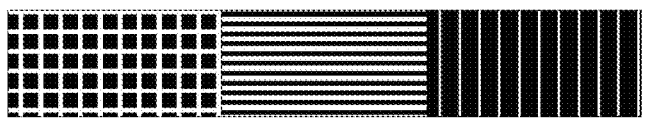
Figure 25:
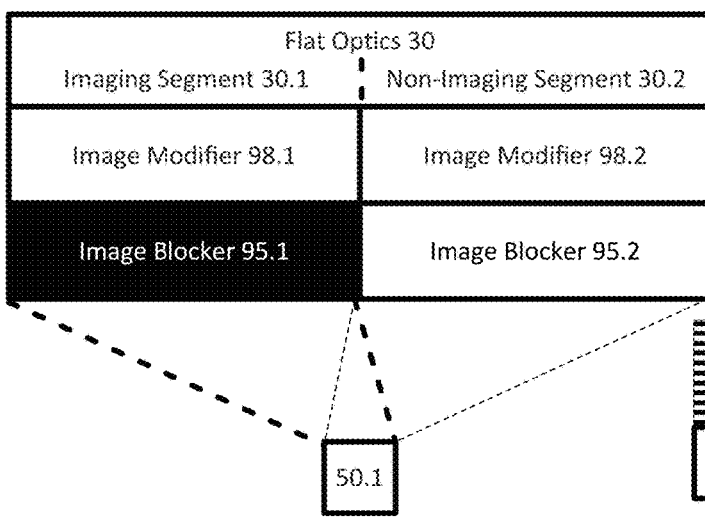
Figure 25:
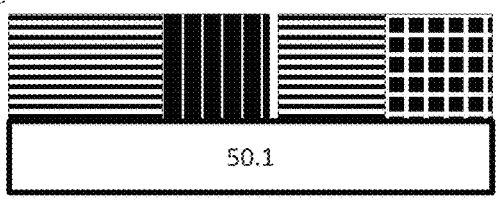

Turning to FIG. 25, FIG. 25 depicts a representative with more than detail than previous FIG. 14 having on top the first embodiment as the actual image 10 passing through the imaging segment 30.1 of the flat optics 30 through the image modifier 98.1 and passing through the image blocker 95.1 (while in its transparent non-blocking mode) such that the original actual image remains in a non-distorted proportional size when finally landing on the image sensor 50.1. In this imaging optical mode the non-imaging segment 30.2 of the flat optics 30 has the actual image 10 passing through the non-imaging segment 30.2 then through the image modifier 98.2 but then being blocked by the image blocker 95.2 (while in its non-transparent blocking mode) such that the otherwise non-imaging image never reaches the imaging sensor 50.1. and the second embodiment of non-imaging optics onto the same imaging sensor 50.1. The bottom is the second embodiment as the actual image 10 passing through the non-imaging segment 30.2 of the flat optics 30 through the image modifier 98.2 and passing through the image blocker 95.2 (while in its transparent non-blocking mode) such that the original actual image becomes a non-imaging image 10.2 (i.e., distorted, discontinuous, and/or non-proportional size when finally landing on the image sensor 50.1). In this imaging optical mode the imaging segment 30.1 of the flat optics 30 has the actual image 10 passing through the imaging segment 30.1 then through the image modifier 98.1 but then being blocked by the image blocker 95.1 (while in its non-transparent blocking mode) such that the otherwise imaging image never reaches the imaging sensor 50.1.

Although the invention has been described in detail, regarding certain embodiments detailed herein, other anticipated embodiments can achieve the same results. Variations and modifications of the present invention will be obvious to those skilled in the art and the present invention is intended to cover in the appended claims all such modifications and equivalents.

What is claimed is:

1. An imaging system having a reconfigurable optical lens comprising an imaging optics lens and an at least one non-imaging optics lens, wherein the imaging optics lens has a first imaging optics position and the at least one non-imaging optics lens has a second non-imaging optics position, wherein the first imaging optics position is stationary relative to the second non-imaging optics position, wherein the imaging optics lens and the at least one non-imaging optics lens is a lens system, wherein the imaging optics lens and the at least one non-imaging optics lens switch optical image focuses of an object onto a single imaging sensor without removal of either the imaging optics lens, or the at least one non-imaging optics lens, whereby switching the optical image focuses is by an image blocker switching between image blocking of the imaging optics lens and the at least one non-imaging optics lens onto the single imaging sensor.

2. The imaging system according to claim 1, wherein the reconfigurable optical lens further comprises an electronically controlled shading mechanism to reduce by at least 80 percent the optical image of an object passing through either the imaging optics lens or the at least one non-imaging optics lens onto the single imaging sensor.

3. The imaging system according to claim 1, wherein the at least one additional non-imaging optics lens is an optically thin lens has a thickness of less than 100 microns.

4. The imaging system according to claim 1, whereby the imaging optics lens and the at least one non-imaging optics lens are within an electronic host device, and whereby the at least one non-imaging optics lens provides user safety features to enable a user of the electronic host device to avoid physical objects on a projected pathway of the user.

5. The imaging system according to claim 1, whereby the imaging optics lens and the at least one non-imaging optics lens are both embedded into a vehicle indicia.

6. The imaging system according to claim 5, whereby the vehicle indicia has a horizontal surface and whereby either the imaging optics lens or the at least one non-imaging optics lens is embedded into the horizontal surface.

7. The imaging system according to claim 1, whereby the combination of the imaging optics lens and the at least one non-imaging optics lens is within an electronic host device and whereby the switch between respective optical image focuses is operable to reduce a distance error by a parallax imaging of the object as determined by the electronic host device by at least 5% of the distance to the object as compared to a distance to the object as determined by only one of the imaging optics lens or the at least one non-imaging optics lens.

8. The imaging system according to claim 3, comprising an image modifier with a quantitative numerical adjustment measure to calculate deviations from the non-imaging optics into a predictable assessment of object location as seen by the imaging sensor.

9. The imaging system according to claim 1, comprising a motion sensor and an angle sensor within an electronic host device whereby the angle sensor is utilized by the electronic host device to calculate an offset angle between a primary optical path to a second optical path and whereby the offset angle is utilized to determine which of the imaging optics lens and the at least one non-imaging optics lens is active.

10. The imaging system according to claim 9, whereby the at least one non-imaging optics lens is at an offset angle with the imaging optics lens.

11. The imaging system according to claim 10, whereby the electronic host device has a user, whereby the electronic host device has a graphical display, and whereby the at least one non-imaging optics lens decouples an imaging angle of the electronic host device graphical display to view the user of the electronic host device with the user viewing angle of the electronic host device graphical display.

12. The imaging system according to claim 1, further comprising an electronic host device and further, within a vehicle, having an external surface color, whereby the imaging system has an active electronic color matching mechanism within the imaging system to match the active electronic color matching mechanism to the vehicle external surface color.

13. The imaging system according to claim 1, further comprising an organic film directly disposed onto either the imaging optics lens or the at least one non-imaging optics lens, the organic film being directly on an organic sensor which is on the single imaging sensor to increase the light sensitivity by at least 5% as compared to the single imaging sensor without the organic film or when the single imaging sensor is a conventional CMOS sensor.

14. The imaging system according to claim 1, whereby the image blocker is an optical absorber.

15. The imaging system according to claim 1, whereby the image blocker is a switchable mirror.

16. An imaging system having a reconfigurable optical lens comprising an imaging optics lens and at least one non-imaging optics lens, wherein the imaging optics lens has a first imaging optics position and the at least one non-imaging optics lens has a second non-imaging optics position, wherein the first imaging optics position is stationary relative to the second non-imaging optics position, wherein the imaging optics lens and the at least one non-imaging optics lens is a lens system, wherein the imaging optics lens and the at least one non-imaging optics lens switch optical image focuses of an object onto a single imaging sensor without removal of either the imaging optics lens, or the at least one non-imaging optics lens, and whereby switching the optical image focuses onto the single imaging sensor is by a switch between a first position of the single imaging sensor and a second position of the single imaging sensor by movement of either a micro-actuator or a MEMS actuator.

17. The imaging system according to claim 16, whereby the combination of the imaging optics lens and the at least one non-imaging optics lens is within an electronic host device and whereby the switch between respective optical image focuses is operable to reduce a distance error by a parallax imaging of the object as determined by the electronic host device by at least 5% of a distance to the object as compared to a distance to the object as determined by only one of the imaging optics lens or the at least one non-imaging optics lens.

18. The imaging system according to claim 17, further comprising an image modifier with a quantitative numerical adjustment measure to calculate deviations from the non-imaging optics into a predictable assessment of object location as seen by the imaging sensor.

19. The imaging system according to claim 16, further comprising a motion sensor and an angle sensor within an electronic host device and whereby the angle sensor is utilized by the electronic host device to calculate an offset angle between a primary optical path to a second optical path and whereby the offset angle is utilized to determine which of the imaging optics lens and the at least one non-imaging optics lens is active.

20. The imaging system according to claim 19, whereby the at least one non-imaging optics lens is at an offset angle with the imaging optics lens.

\* \* \* \* \*